United States Patent
Onaka

(10) Patent No.: US 8,665,331 B2
(45) Date of Patent: Mar. 4, 2014

(54) IN-VEHICLE IMAGE DISPLAY APPARATUS

(75) Inventor: Junichiro Onaka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 301 days.

(21) Appl. No.: 13/079,023

(22) Filed: Apr. 4, 2011

(65) Prior Publication Data

US 2011/0317014 A1    Dec. 29, 2011

(30) Foreign Application Priority Data

Jun. 28, 2010  (JP) .................................. 2010-146345

(51) Int. Cl.
    *H04N 9/47*  (2006.01)
(52) U.S. Cl.
    USPC ....................................................... 348/148
(58) Field of Classification Search
    None
    See application file for complete search history.

(56) References Cited

U.S. PATENT DOCUMENTS

| | | | |
|---|---|---|---|
| 5,335,743 A * | 8/1994 | Gillbrand et al. ............ | 180/178 |
| 7,680,574 B2 * | 3/2010 | Berg et al. ...................... | 701/41 |
| 8,207,868 B2 * | 6/2012 | Watanabe ................ | 340/995.17 |
| 2003/0080877 A1 * | 5/2003 | Takagi et al. ............. | 340/932.2 |
| 2008/0012940 A1 * | 1/2008 | Kanaoka et al. ............ | 348/148 |
| 2008/0088577 A1 * | 4/2008 | Lenneman et al. ........... | 345/156 |
| 2009/0040306 A1 * | 2/2009 | Foote et al. .................. | 348/148 |
| 2009/0262045 A1 * | 10/2009 | Nakano et al. ................ | 345/32 |
| 2010/0066833 A1 * | 3/2010 | Ohshima et al. ............ | 348/148 |
| 2010/0070139 A1 * | 3/2010 | Ohshima et al. ............. | 701/42 |
| 2011/0043489 A1 * | 2/2011 | Yoshimoto et al. .......... | 345/175 |

FOREIGN PATENT DOCUMENTS

| | | |
|---|---|---|
| JP | 2008-141622 | 6/2008 |
| JP | 2009-239674 | 10/2009 |
| JP | 2009239674 A * | 10/2009 |
| JP | 2010-089638 | 4/2010 |
| JP | 2010089638 A * | 4/2010 |

OTHER PUBLICATIONS

Japanese Office Action for corresponding JP Application No. 2010-146345, May 15, 2012.

* cited by examiner

*Primary Examiner* — Dave Czekaj
*Assistant Examiner* — Tyler W Sullivan
(74) *Attorney, Agent, or Firm* — Ditthavong Mori & Steiner, P.C.

(57) ABSTRACT

An in-vehicle image display apparatus includes an image capture device and a display. An image generator is configured to combine the plurality of images captured by the image capture device and to generate a bird's eye view image in which a point of view has been changed. An operation device is capable of being operated by a vehicle occupant. An operation device includes a first switch provided in a central area of the operation device in a front view to be used to display the bird's eye view image in the display. The second switches are provided at positions around the central area to be used to display the plurality of images in the display. The positions correspond to the plurality of areas around the vehicle in a case in which the central area is considered as a vehicle position of the vehicle when viewed from above.

10 Claims, 9 Drawing Sheets

IN-VEHICLE IMAGE DISPLAY APPARATUS

CROSS-REFERENCE TO RELATED APPLICATIONS

The present application claims priority under 35 U.S.C. §119 to Japanese Patent Application No. 2010-146345, filed Jun. 28, 2010, entitled "IN-VEHICLE IMAGE DISPLAY APPARATUS". The contents of this application are incorporated herein by reference in their entirety.

BACKGROUND OF THE INVENTION

1. Field of the Invention

The present invention relates to an in-vehicle image display apparatus.

2. Description of the Related Art

Hitherto, in-vehicle image display apparatuses that display images of individual views, such as a front view, side views, and a rear view, around a vehicle which have been captured using a plurality of cameras are known. In some of the in-vehicle image display apparatuses, a view that a user focuses on cannot be displayed by performing a simple operation. Accordingly, in recent years, an in-vehicle image display apparatus in which an input switch screen is provided has been proposed, and, in the input switch screen, a plurality of input switches for specifying image data that is to be displayed on an image data display screen are displayed (see, for example, Japanese Unexamined Patent Application Publication No. 2008-141622).

However, in reality, in the case of displaying of the input switches in a navigation screen or the like, as in the in-vehicle image display apparatus described above, the navigation screen or the like is comparatively distant from a driver and is not easily operated. Accordingly, a display switch is provided for each view at a certain position so that the driver near a steering wheel can easily operate the display switch, e.g., in the vicinity of a center console or an instrument panel. Furthermore, because the above-mentioned cameras are optionally available and are attached later in most cases, it is difficult to ensure a space for camera switches in advance. Thus, a configuration in which the display switches, each of which is provided for a corresponding one of the views, are placed so as to be distant from each other, or a configuration in which switching among displays is performed by sequential display using one display switch are employed in most cases.

Furthermore, an in-vehicle image display apparatus has been proposed, in which a screen in which images of individual views have been combined with each other is displayed in order to grasp the images of the surroundings of a vehicle at one time.

SUMMARY OF THE INVENTION

According to one aspect of the present invention, an in-vehicle image display apparatus includes an image capture device, a display, an image generator, and an operation device. The image capture device is capable of capturing a plurality of images of a plurality of areas around a vehicle. The display is capable of selectively displaying the plurality of images captured by the image capture device. The image generator is configured to combine the plurality of images captured by the image capture device and to generate a bird's eye view image in which a point of view has been changed. The operation device is capable of being operated by a vehicle occupant. The operation device includes a first switch and second switches. The first switch is provided in a central area of the operation device in a front view to be used to display the bird's eye view image in the display. The second switches are provided at positions around the central area to be used to display the plurality of images in the display. The positions correspond to the plurality of areas around the vehicle in a case in which the central area is considered as a vehicle position of the vehicle when viewed from above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
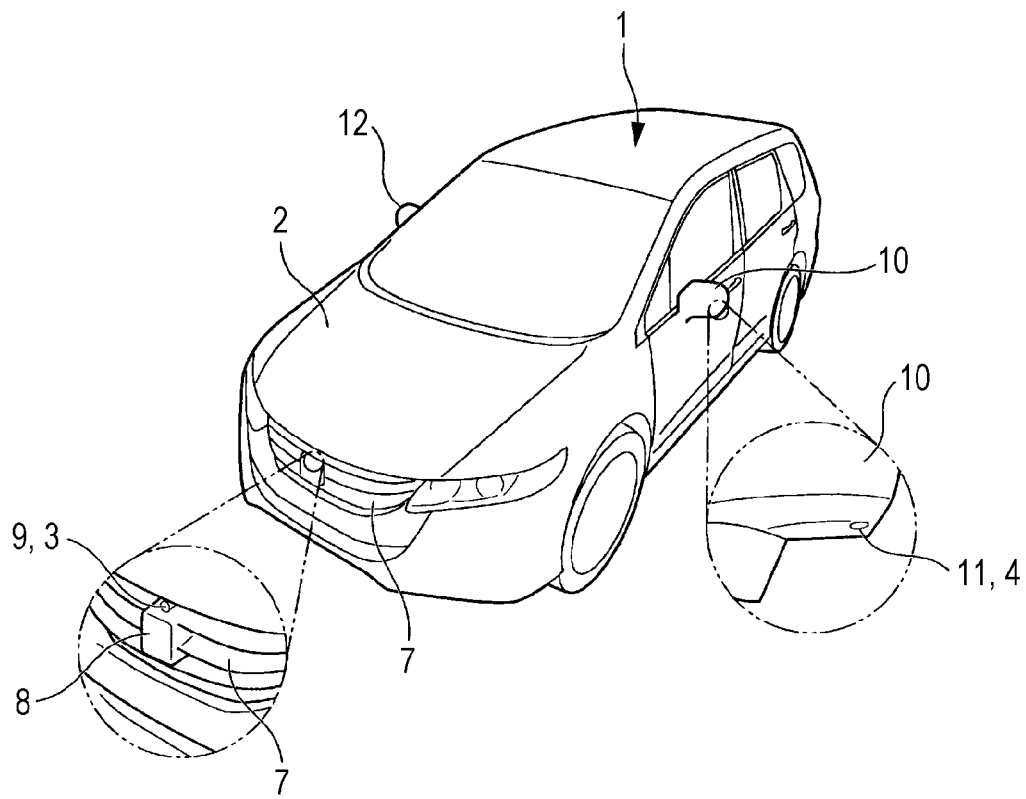
FIGS. 1A and 1B are diagrams illustrating arrangement of vehicle-mounted cameras in a first embodiment of the present invention.

The embodiments will now be described with reference to the accompanying drawings, wherein like reference numerals designate corresponding or identical elements throughout the various drawings.

An in-vehicle image display apparatus according to a first embodiment of the present invention will be described with reference to the drawings.

Figure 1B:
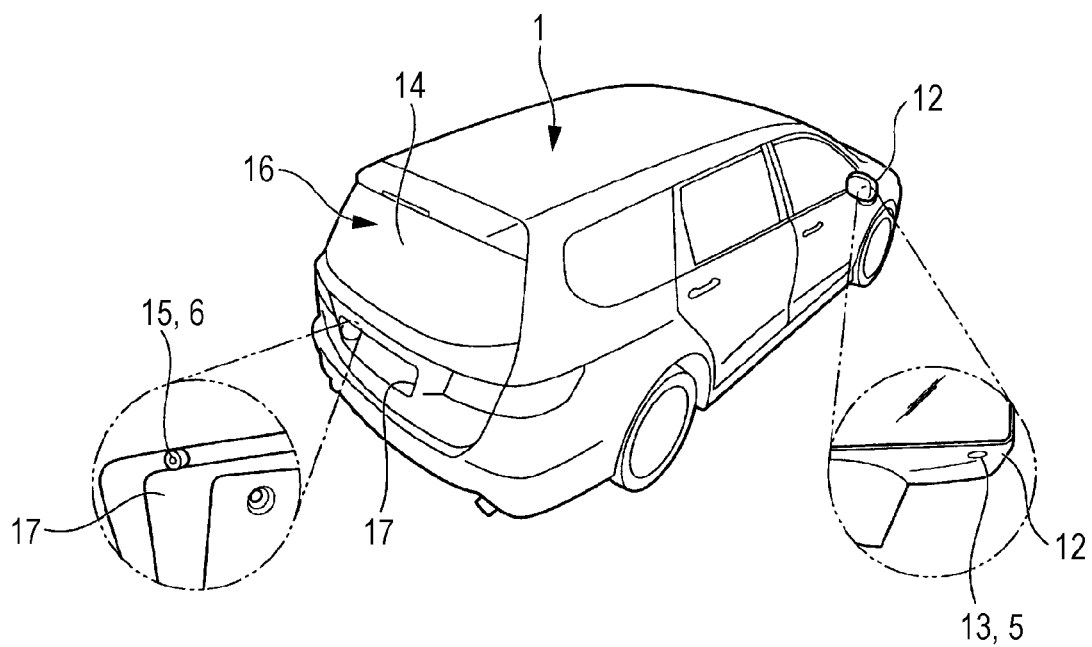

A vehicle 1 in which an in-vehicle image display apparatus according to the first embodiment is mounted is a so-called minivan-type vehicle that includes a hood 2, as illustrated in FIGS. 1A and 1B. The vehicle 1 includes a front camera 3, a left side camera 4, a right side camera 5, and a rear camera 6 that serve as image capture elements.

The front camera 3 mainly captures an image of a road that cannot visually be recognized by a driver in an intersection in which obstacles such as walls or fences exist on the left and right sides, and that extends in the left-right direction. Regarding the front camera 3, a lens portion 9 is placed at the front end of the vehicle 1, e.g., on the top of an emblem attachment portion 8 that is placed substantially at the center of a front grille 7 of the vehicle 1. The front camera 3 captures an image of an area (hereinafter, simply referred to as a "front blind view") that extends from the front edge of the vehicle 1 in the left-right direction.

The left side camera 4 captures an image of an area (hereinafter, simply referred to as a "left side view") that is located at the left front of the vehicle 1 or an area that is located at the left rear of the vehicle 1, which are blind spots for the driver. The left side camera 4 is built in a left side mirror 10. A lens portion 11 is placed in the bottom surface of the left side mirror 10, and is positioned slightly near the outside in a vehicle width direction.

Similarly, the right side camera 5 captures an image of an area (hereinafter, simply referred to as a "right side view") that is located at the right front of the vehicle 1, which is a blind spot for the driver. The right side camera 5 is built in a right side mirror 12. A lens portion 13 is placed in the bottom surface of the right side mirror 12, and is positioned slightly near the outside in the vehicle width direction.

The rear camera 6 captures an image of an area (hereinafter, simply referred to as a "rear view") that is located at the obliquely lower rear of a rear window glass 14 of the vehicle 1, which is a blind spot for the driver. A lens portion 15 of the rear camera 6 is attached to, for example, the upper edge of a license-plate attachment portion 17 of a tailgate 16, and is placed so as to face the obliquely lower rear of the vehicle 1.

Figure 2:
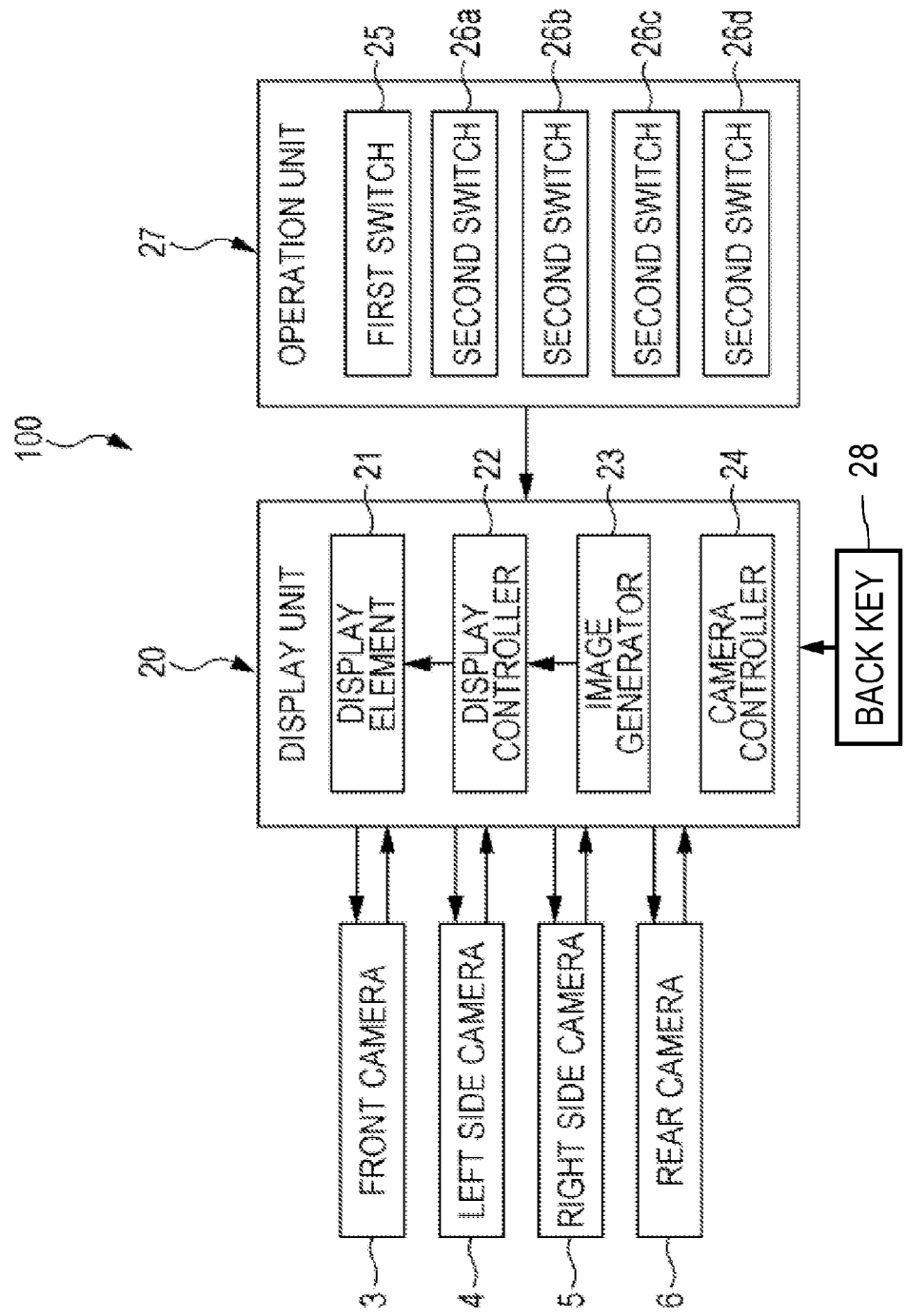
FIG. 2 is a block diagram illustrating an overall configuration of an in-vehicle image display apparatus in the first embodiment of the present invention.

FIG. 2 schematically illustrates a configuration of the in-vehicle image display apparatus 100. As illustrated in FIG. 2, image data that has been captured by the front camera 3, the left side camera 4, the right side camera 5, and the rear camera 6 are input to the display unit 20.

The display unit 20 includes a display element 21, a display controller 22, an image generator 23, and a camera controller 24. An operation unit 27 includes one first switch 25 and a plurality of second switches, more specifically, four second switches 26a to 26d, and is connected to the display unit 20.

The display element 21 is, for example, a liquid crystal display of a navigation device (not illustrated). The display element 21 is placed, for example, on the top of an instrument panel (not illustrated) of the vehicle 1, and is positioned substantially at the center of the instrument panel in the vehicle width direction. Note that the display element 21 may be provided separately from a display of the navigation device.

The display controller 22 performs display control on the display element 21, for example, on the basis of an input signal supplied from the operation unit 27 that accepts an operation input provided by a vehicle occupant. The display controller 22 mainly performs control of causing the display element 21 to selectively display individual images that have been captured by the front camera 3, the left side camera 4, the right side camera 5, and the rear camera 6, which are described above, and control of causing the display element 21 to selectively display an image that has been generated by the image generator 23.

The image generator 23 combines individual images that have been captured by the front camera 3, the left side camera 4, the right side camera 5, and the rear camera 6, which are described above, with each other, thereby generating an image (see FIG. 4, hereinafter, simply referred to as an "image 40 of an around view") in which the point of view has been changed so that the vehicle 1 is viewed from above. The image generator 23 outputs the image 40 of the around view to the display controller 22. With the image 40 of the around view, the driver can easily check, in one screen, which direction an obstacle exists in, over an entire area around the vehicle 1 that is the center of the area.

The camera controller 24 controls the front camera 3, the left side camera 4, the right side camera 5, and the rear camera 6. In accordance with a control instruction that is provided from the camera controller 24, control of starting or stopping image capture using the front camera 3, the left side camera 4, the right side camera 5, and the rear camera 6 is performed.

Figure 3A:
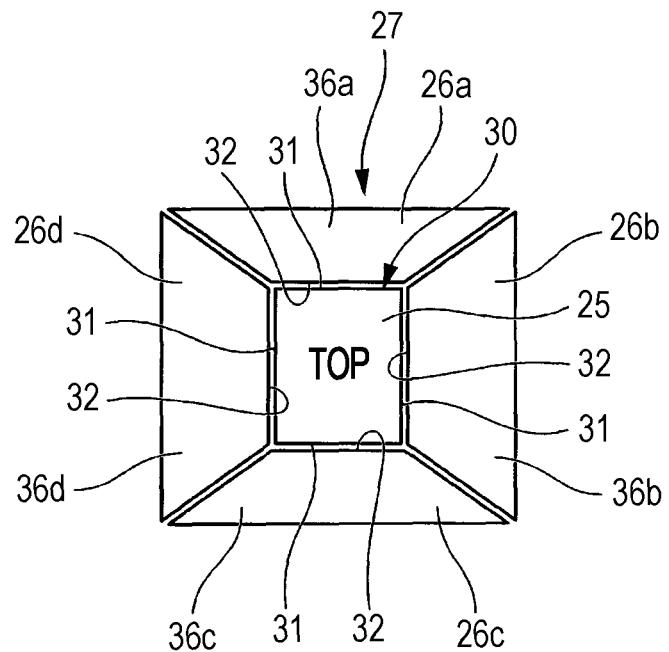
FIGS. 3A and 3B are diagrams illustrating an operation unit in the first embodiment of the present invention, which are a top view and a perspective view, respectively.
Figure 3B:
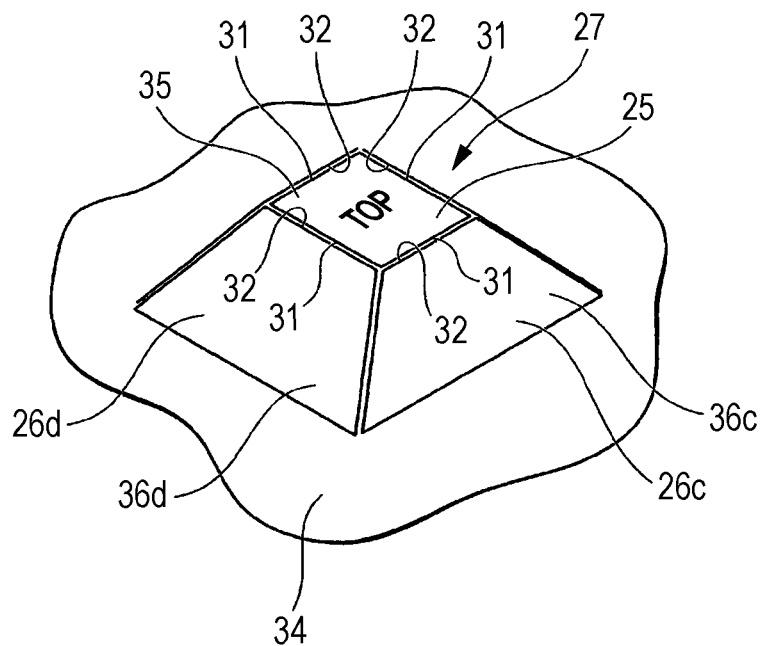

As illustrated in FIGS. 3A and 3B, the operation unit 27 is formed in a substantially rectangular shape in top view. The operation unit 27 is disposed in a place that an operation hand of the driver can easily reach, for example, around a meter panel (not shown) of the instrument panel or in the vicinity of the display element 21 (shown in FIG. 2). Regarding the operation unit 27, the first switch 25 that is formed in a substantially rectangular shape in top view is placed in a central area 30 when viewed from above in the height direction of the operation unit 27, i.e., in front view. Furthermore, in a case in which the position of the vehicle 1 when viewed from above is considered as the position of the central area 30, the operation unit 27 includes the second switches 26a to 26d, and the second switches 26a to 26d are placed at respective positions, which correspond to image capture positions for the front blind view, the left side view, the right side view, and the rear view, with respect to the central area 30 along the outer periphery of the central area 30, i.e., around the central area 30. Each of the second switches 26a to 26d is formed in a substantially trapezoidal shape in top view. Each of upper sides 32 of the second switches 26a to 26d is placed so as to face a corresponding one of sides 31 of the first switch 25. The outer shape of the operation unit 27, which is the above-mentioned substantially rectangular shape, is formed using lower sides of the second switches 26a to 26d.

Furthermore, the operation unit 27 is formed in a substantially square pyramid shape (see FIG. 3B). A face 35, which is on one end side in an operation direction, of the first switch 25 is placed at a certain position so that the face 35 protrudes to a level higher than a level of each of the other faces from a surface 34 of the instrument panel or the like on which the operation unit 27 is disposed. Furthermore, top faces 36a to 36d of the second switches 26a to 26d that are placed around the first switch 25 are faces that are inclined to the outside. As described above, because the first switch 25 protrudes to a level higher than a level of each of the other switches and the second switches 26a to 26d have the inclined faces, the driver can recognize the arrangement of the first switch 25 and the individual second switches 26a to 26d by touching the first switch 25 and the second switches 26a to 26d with an operation finger of the driver without visually recognizing the operation unit 27.

Figure 4:
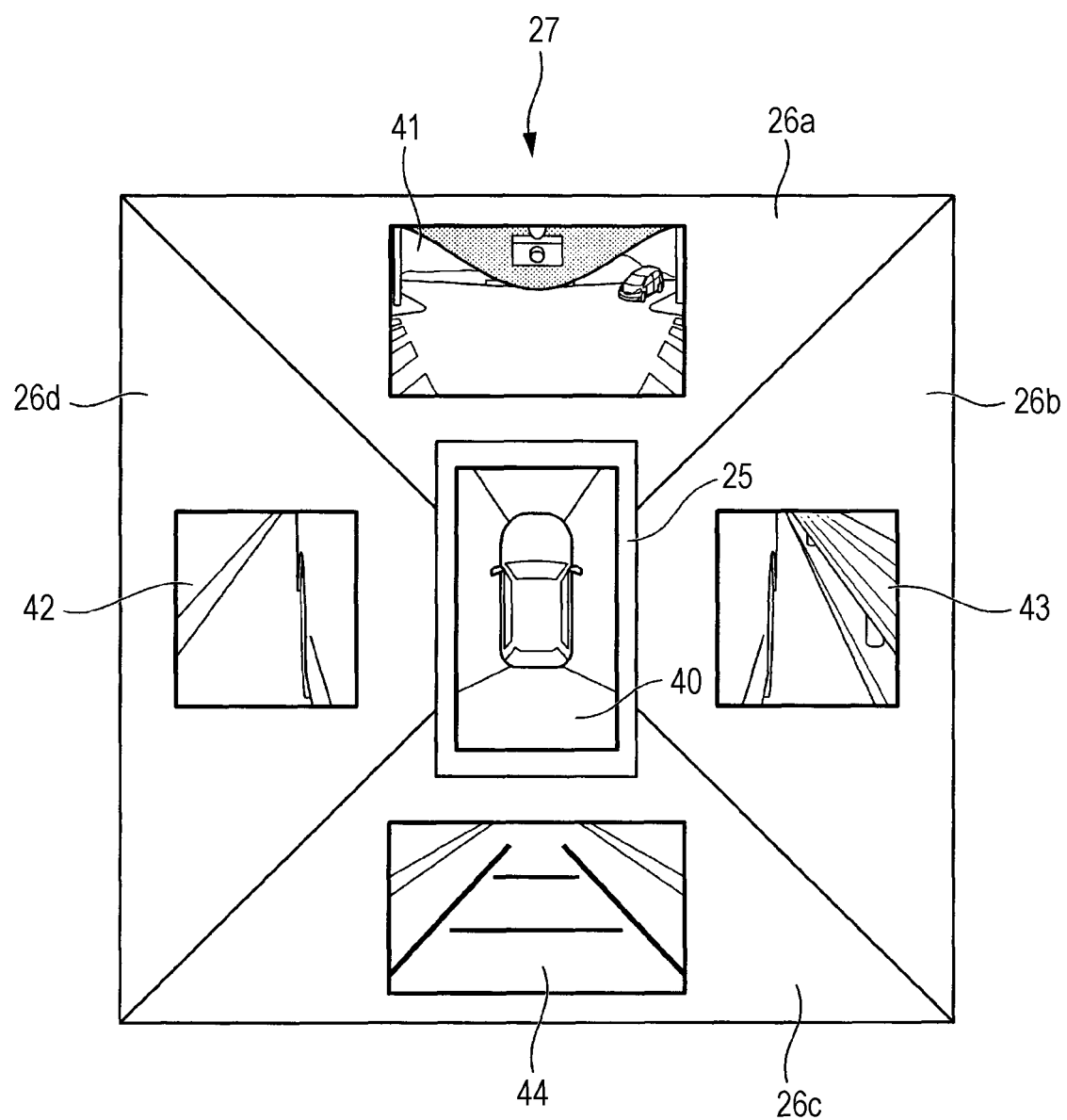
FIG. 4 is a diagram illustrating images that are associated with a first switch and second switches of the operation unit in the first embodiment of the present invention.
Figure 5:
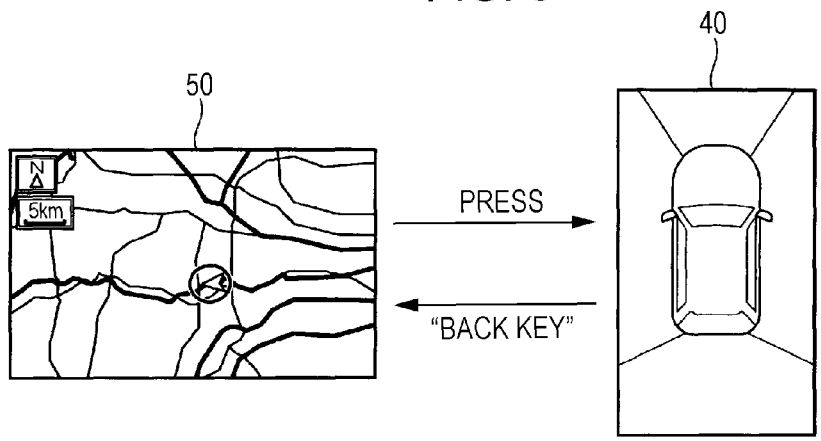
FIG. 5 is a diagram illustrating an example of an image display of an around view in the first embodiment of the present invention.

FIG. 4 schematically illustrates a state in which the first switch 25 and the second switches 26a to 26d of the operation unit 27 correspond to display images that are individually assigned to the first switch 25 and the second switches 26a to 26d. As illustrated in FIG. 4, when the first switch 25 is operated, the display controller 22 causes the display element 21 to display the image 40 of the around view that has been generated by the image generator 23. A back key 28, shown in FIG. 2, is operated, whereby the display controller 22 causes the display element 21 to display a navigation screen 50 (see FIG. 5).

Figure 6:
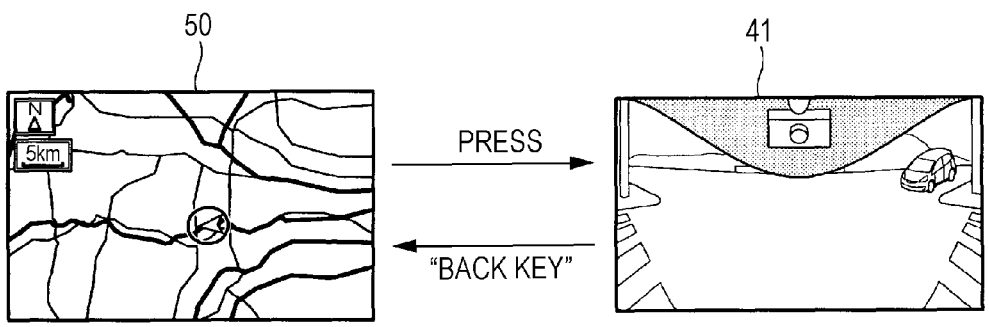
FIG. 6 is a diagram illustrating an example of an image display of a front blind view in the first embodiment of the present invention.
Figure 7:
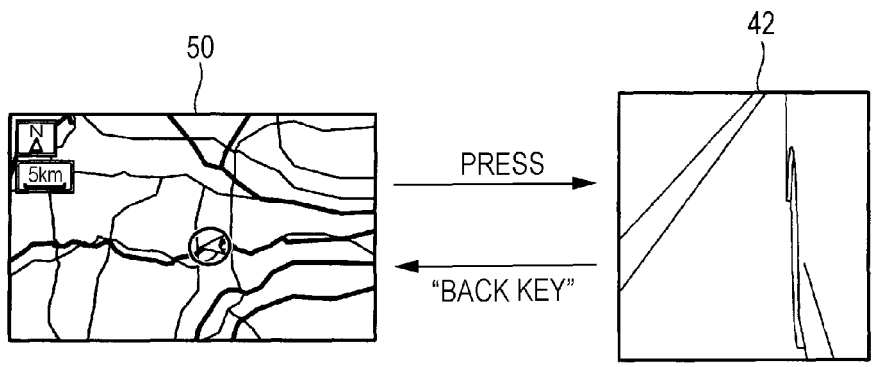
FIG. 7 is a diagram illustrating an example of an image display of a left side view in the first embodiment of the present invention.

Similarly, when the second switch 26a that is placed on a side corresponding to the front blind view with respect to the central area 30 in which the first switch 25 is placed is operated, the display controller 22 causes the display element 21 to display the image 41 of the front blind view. The back key is operated, whereby the display controller 22 causes the display element 21 to display the navigation screen 50 (see FIG. 6). Furthermore, when the second switch 26d that is placed on a side corresponding to the left side view with respect to the central area 30 is operated, the display controller 22 causes the display element 21 to display the image 42 of the left side view. The back key is operated, whereby the display controller 22 causes the display element 21 to display the navigation screen 50 (see FIG. 7).

Figure 8:
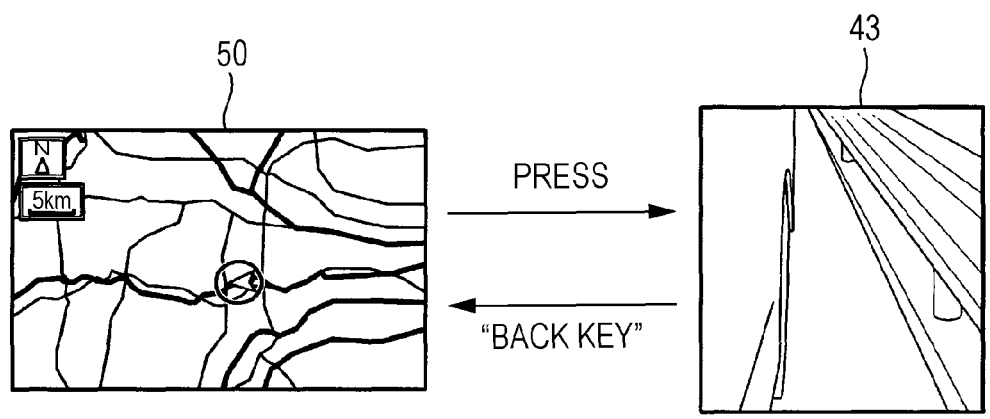
FIG. 8 is a diagram illustrating an example of an image display of a right side view in the first embodiment of the present invention.
Figure 9:
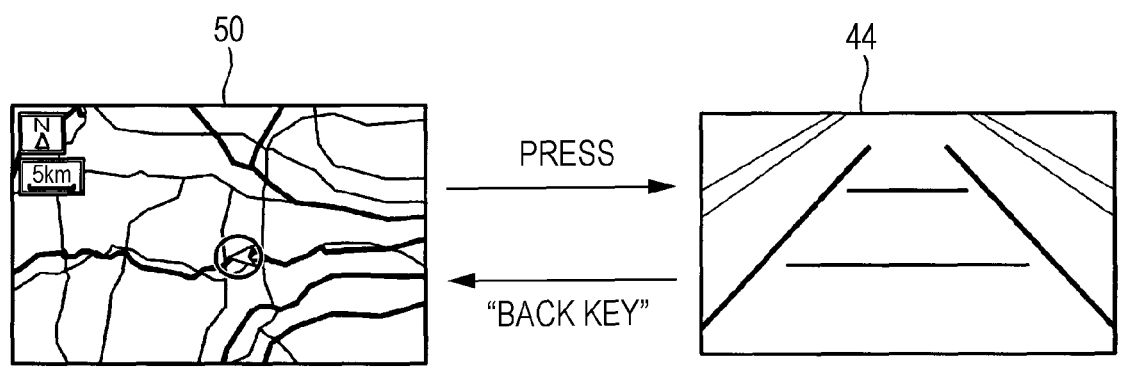
FIG. 9 is a diagram illustrating an example of an image display of a rear view in the first embodiment of the present invention.

Similarly, when the second switch 26b that is placed on a side corresponding to the right side view with respect to the central area 30 is operated, the display controller 22 causes the display element 21 to display the image 43 of the right side view. The back key is operated, whereby the display controller 22 causes the display element 21 to display the navigation screen 50 (see FIG. 8). Moreover, when the second switch 26c that is placed on a side corresponding to the rear view with respect to the central area 30 is operated, the display controller 22 causes the display element 21 to display an image 44 of the rear view. The back key is operated, whereby the display controller 22 causes the display element 21 to display the navigation screen 50 (see FIG. 9).

Accordingly, in the first embodiment described above, the arrangement of the respective images of the front blind view, the left side view, the right side view, and the rear view around the vehicle 1 in a case in which the position of the vehicle 1 when viewed from above is considered as a center and the arrangement of the respective second switches 26a to 26d with respect to the first switch 25 correspond to each other. Thus, the operator operates the first switch 25 placed in the central area 30, whereby the operator can cause the display element 21 to display the image 40 of the around view when the vehicle 1 is viewed from above. Furthermore, the operator operates one of the second switches 26a to 26d that is placed so as to correspond to the position of a view which the operator desires to display among the front blind view, the left side view, the right side view, and the rear view around the vehicle 1, whereby the operator can cause the display element 21 to display an image that the operator desires to display among the images 41 to 44. Therefore, regardless of a learning level of the operator, the operator can instantly select, simply by intuitively performing an operation, an image that the operator intends to select. As a result, a load imposed on the operator can effectively be reduced.

Next, an in-vehicle image display apparatus according to a second embodiment of the present invention will be described. Note that, although the in-vehicle image display apparatus 100 according to the first embodiment described above includes the operation unit 27 that is dedicated to selecting the individual views, the in-vehicle image display apparatus according to the second embodiment is different from the in-vehicle image display apparatus 100 according to the first embodiment in that a steering switch which has been already provided in the vehicle 1 is used. Accordingly, in the description of the second embodiment, FIGS. 1A and 1B and FIG. 2 are used as references. Additionally, the same reference numerals denote the same elements, and a redundant description is omitted.

Figure 10:
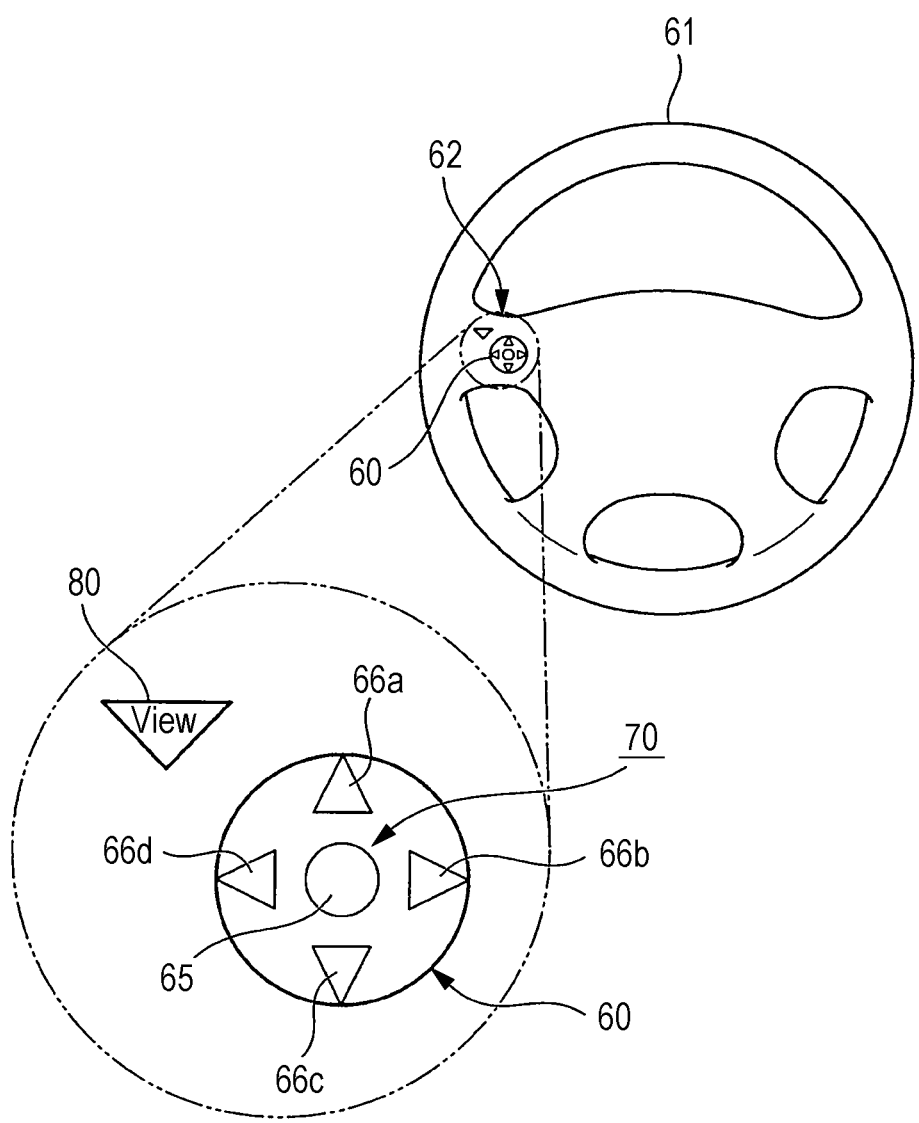
FIG. 10 is a front view illustrating an operation unit in a second embodiment of the present invention.

FIG. 10 illustrates a steering switch 60 that is an operation unit in the in-vehicle image display apparatus according to the second embodiment. The steering switch 60 is provided in, for example, a spoke portion 62 of a steering wheel 61. At a normal time, the steering switch 60 accepts a display switching operation, for example, for a multi-information display that is placed in the meter panel (not illustrated), and an operation input, for example, for adjustment of the volume of a sound that is output from a speaker (not illustrated).

Regarding the steering switch 60, a first switch 65 is provided in a central area 70 in front view, i.e., when viewed from above in the height direction of the steering switch 60 with respect to the outer face of the steering wheel 61, that is, when viewed from the front. Furthermore, second switches 66a to 66d are provided on the upper, lower, left and right sides around the central area 70.

The image 41 of the front blind view can be selected using the second switch 66a that is positioned above the central area 70. The image 44 of the rear view can be selected using the second switch 66c that is positioned below the central area 30. Furthermore, the image 42 of the left side view can be selected using the second switch 66d that is positioned on the left side of the central area 70. The image 43 of the right side view can be selected using the second switch 66b that is positioned on the right side of the central area 70.

Moreover, a view switch 80 used to switch the function of the steering switch 60 is provided in the vicinity of the steering switch 60. The view switch 80 is operated, whereby the steering switch 60 enters a state in which the individual images of the front blind view, the left side view, the right side view, and the rear view can be selected by performing an operation of the steering switch 60. A selected image is displayed on the display element 21 by the display controller 22.

Accordingly, in the in-vehicle image display apparatus according to the second embodiment described above, an increase in the number of components can be reduced by effectively utilizing the steering switch. Additionally, after the operator operates the view switch 80, the operator operates the first switch 65 that is placed in the central area 70, whereby the operator can cause the display element 21 to display the image 40 of the around view when the vehicle 1 is viewed from above. In addition, the operator operates one of the second switches 66a to 66d that is placed so as to correspond to the position of a view which the operator desires to display among the front blind view, the left side view, the right side view, and the rear view around the vehicle 1, whereby the operator can cause the display element 21 to display an image that the operator desires to display among the images 41 to 44. Therefore, regardless of a learning level of the operator, the operator can instantly select, simply by intuitively performing an operation, an image that the operator intends to select.

Next, an in-vehicle image display apparatus according to a third embodiment of the present invention will be described. Note that the in-vehicle image display apparatus according to the third embodiment is obtained by adding a two-level pressing detection function to the first switch 25 and the second switches 26a to 26d of the operation unit 27 of the in-vehicle image display apparatus according to the second embodiment described above. Accordingly, FIGS. 1A and 1B and FIG. 2 are used as references. Additionally, the same reference numerals denote the same elements, and a redundant description is omitted.

As in the first embodiment described above, the in-vehicle image display apparatus according to the third embodiment includes the first switch 25 and the second switches 26a to 26d in the operation unit 27. Each of the first switch 25 and the second switches 26a to 26d detects, as a first pressing operation, a lightly pressing operation that is performed by a vehicle occupant, and detects, as a second pressing operation, an operation of pressing a switch more firmly than a lightly pressing operation that is detected as the first pressing operation. For example, the driver can feel that a pressing operation is moderately performed at a certain position for the first pressing operation before the driver shifts the pressing operation from the first pressing operation to the second pressing operation. Note that, although a case in which the first pressing operation is detected as a lightly pressing operation and the second pressing operation is detected as a firmly pressing operation is described, for example, an operation of touching each of the first switch 25 and the second switches 26a to 26d may be detected as the first pressing operation, and a typical pressing operation may be detected as the second pressing operation. In this case, a capacitance-type operation input element is used as each of the first switch 25 and the second switches 26a to 26d, and the toughing operation can be detected by the capacitance-type operation input element. Furthermore, the operation input element is formed so as to be capable of being pressed as a pressing button, and the typical pressing operation can be detected by the operation input element.

Figure 11:
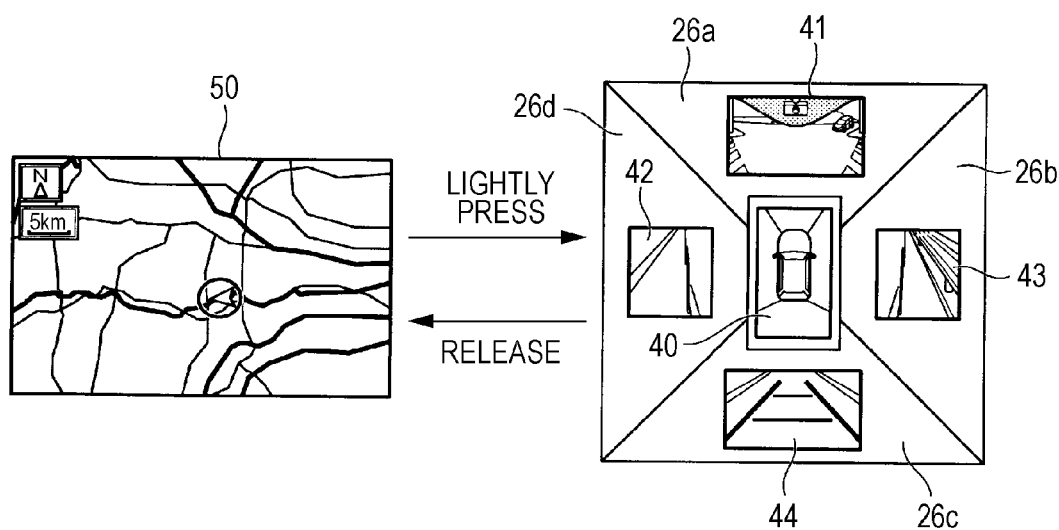
FIG. 11 is a diagram illustrating an example of an image display that is shown by performing a first pressing operation in a third embodiment of the present invention.

As illustrated in FIG. 11, when the first pressing operation (for example, a lightly pressing operation) that has been performed by an operation finger of a vehicle occupant is detected, the display controller 22 (see FIG. 2) causes the display element 21 (see FIG. 2) to display an image of a view corresponding to the first switch 25 or one of the second switches 26a to 26d by which the first pressing operation is detected. Next, when the vehicle occupant moves the operation finger thereof off the first switch 25 or one of the second switches 26a to 26d and release of the first pressing operation is detected, the display controller 22 instantly returns the image of the view displayed on the display element 21 to an image display of navigation or the like that has been shown before the image is displayed. Note that, although a display pattern illustrated in FIG. 4 is illustrated in FIG. 11 for convenience of illustration as if the display pattern is displayed by performing the first pressing operation, only an image corresponding to the first switch 25 or one of the second switches 26a to 26d that has been operated is displayed for a brief period of time in reality.

Figure 12:
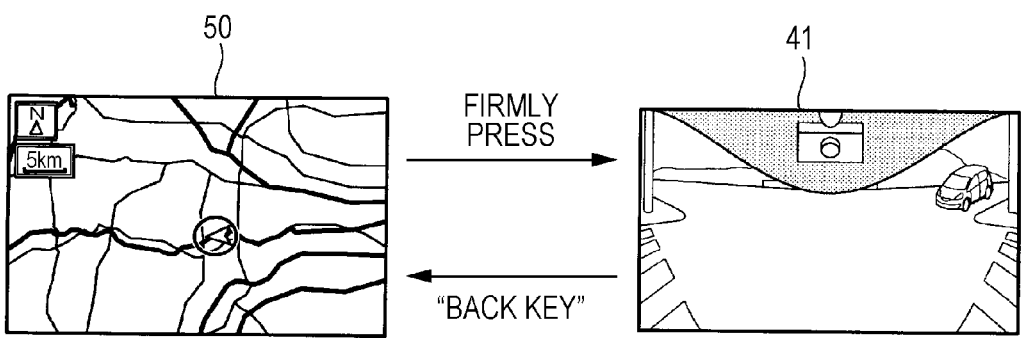
FIG. 12 is a diagram illustrating an example of an image display that is shown by performing a second pressing operation in the third embodiment of the present invention.

In contrast, as illustrated in FIG. 12, when the second pressing operation (for example, a firmly pressing operation) that has been performed by an operation finger of the vehicle occupant is detected, as in the case in which the first pressing operation is detected, the display controller 22 causes the display element 21 to display an image (the image 41 of the front blind view in FIG. 12) corresponding to the first switch 25 or one of the second switches 26a to 26d. After that, even when the vehicle occupant moves the operation finger thereof off the first switch 25 or one of the second switches 26a to 26d and release of the second pressing operation is detected, the image continues being displayed. Then, at a point in time when an operation input to the back key that is separately provided is provided by the vehicle occupant, the display controller 22 returns the image of the view displayed on the display element 21 to an image display of navigation or the like that has been shown before the image is displayed.

Accordingly, in the in-vehicle image display apparatus according to the third embodiment described above, for example, when the vehicle occupant desires to watch each of the images 40 to 44 of the individual views for only a brief period of time, the vehicle occupant performs the first pressing operation to display the image. After that, the vehicle occupant releases the first pressing operation, whereby the screen can instantly be returned to the navigation screen 50 or the like that has been shown before the screen is displayed. Furthermore, for example, when the vehicle occupant desires to watch each of the images 40 to 44 of the individual views for a long period of time, the vehicle occupant performs the second pressing operation, whereby the image can be continuously displayed for a predetermined period of time until the back key is operated. Thus, the convenience can be increased, and more reduction in the load imposed on the driver can be achieved.

Moreover, as another form of the third embodiment, whether a pressing operation is the first pressing operation or the second pressing operation is determined in accordance with a pressing time for which a vehicle occupant presses a switch. For example, in a case in which the pressing time is equal to or shorter than one second, when the driver moves an operation finger thereof off the first switch 25 or one of the second switches 26a to 26d, an image of a view displayed on the display element 21 is instantly returned to an image display of navigation or the like that has been shown before the image is displayed. In contrast, in a case in which the pressing time is equal to or longer than one second, an image of a view displayed on the display element 21 is not returned to an image display of navigation or the like until the back key is operated or a fixed period of time elapses.

Furthermore, when pressing of the first switch 25 or one of the second switches 26a to 26d for a long period of time is detected, a view corresponding to the first switch 25 or one of the second switches 26a to 26d may be displayed in an expansion manner. For example, when a pressing operation is performed on the first switch 25, the image 40 of the around view is displayed on the display element 21. However, by pressing the first switch 25 for a long period of time, the image 40 is displayed in an expansion manner in which the current view is zoomed out so as to be changed to a view from a higher position in the sky. As described above, by using pressing of a switch for a long period of time and display of an image in an expansion manner, in which the current view is zoomed out, in cooperation with each other, an image of a view can be more intuitively changed to another image of the view. Additionally, display of an image in another expansion manner may be performed as follows. For example, when the second switch 26a is pressed for a long period of time, the image 41 of the front blind view is zoomed in. Accordingly, an image of a place that is not easily seen can be intuitively displayed in an expansion manner.

Note that the present invention is not limited to the configurations in the individual embodiments described above. Design modifications may be made without departing from the gist of the present invention.

For example, in the first embodiment described above, the vehicle 1 of the minivan type is described as one example. However, the embodiment of the present invention may be applied to vehicles 1 of various types including, for example, a sedan type.

Furthermore, a case in which the operation unit 27 is formed in a square pyramid shape is described. However, if the second switches are placed around the first switch 25 so as to be adjacent to the first switch 25, the shape of the operation unit 27 is not limited to a square pyramid shape. The shape of the operation unit 27 may be, for example, a truncated conical shape.

Moreover, in the individual embodiments described above, a case in which an image display is returned to an image display of navigation or the like by accepting an operation input to the back key is described. The image display may be returned to an image display that has been shown before the image display is shown, by detecting a timeout of a predetermined period that is set in advance, instead of an operation input to the back key.

Furthermore, in the individual embodiments described above, a case in which the second switches are placed in the central area 30 or 70 in the four directions such as the upward, downward, left, and right directions. However, selection of a direction from a continuous range of directions in which directions that can be selected are not determined as directions that are changed in certain steps may be realized by forming the second switches, which are placed in the four directions, as one piece and by using capacitance-type touch sensors or the like. A case of display of, on the display element 21, an image of a view that is located at an intermediate position between the individual views, e.g., an intermediate position between the left side view and the front blind view, is supposed. In this case, an image in which adjacent views have been combined with each other, e.g., an image in which the left side view and the front blind view have been combined with each other, may be generated by the image generator 23, and the display element 21 may be caused to display the generated image. With this configuration, an image can more intuitively be displayed, and the convenience can be increased.

Additionally, a case in which the operation unit 27 is placed on the instrument panel and a case in which the steering switch 60 is used also as an operation unit are described. However, the operation unit 27 may be placed, for example, at a tip of a turn switch (not illustrated) that is used to perform a direction instruction operation.

Figure 13:
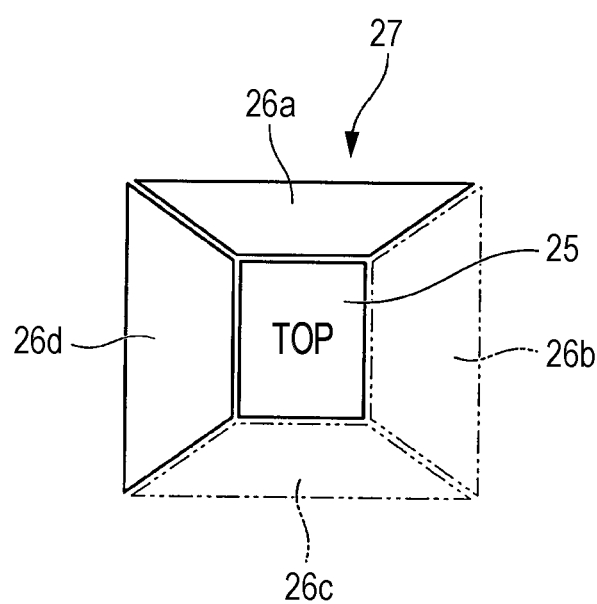
FIG. 13 is a front view illustrating an operation unit in another embodiment of the present invention.

Furthermore, a case in which the four vehicle-mounted cameras, i.e., the front camera 3, the left side camera 4, the right side camera 5, and the rear camera 6, are disposed in the vehicle 1 is described. However, the number of vehicle-mounted cameras is not limited to four. When five or more vehicle-mounted cameras are disposed, new second switches corresponding to the arrangement of the vehicle-mounted cameras may be provided. Moreover, when the number of vehicle-mounted cameras is smaller than four, the second switches corresponding to the vehicle-mounted cameras that are not disposed may be omitted. For example, if the right side camera 5 and the rear camera 6 are not disposed, as illustrated in FIG. 13, the second switches 26b and 26c corresponding to the right side camera 5 and the rear camera 6 are omitted. With this configuration, which camera that captures an image of the corresponding view is not disposed can be intuitively recognized from the arrangement of the second switches.

According to the embodiment of the present invention, the arrangement of the plurality of areas around the vehicle in a case in which the position of the vehicle when viewed from above is considered as a center and the arrangement of the second switches in a case in which the first switch is considered as a center correspond to each other. Accordingly, an operator operates one of the second switches that is placed so as to correspond to a position of an area which the operator desires to display among the plurality of areas around the vehicle, whereby the operator can cause the display unit to display an image that the operator desires to display and that has been captured by the image capture unit. Therefore, regardless of a learning level of the operator, the operator can instantly select, simply by intuitively performing an operation, an image that the operator intends to select. Thus, the embodiment of the present invention has an advantage that a load imposed on the operator can more effectively be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. An in-vehicle image display apparatus comprising:
image capture devices capable of capturing a plurality of images of a plurality of areas around a vehicle;
a display capable of selectively displaying the plurality of images captured by the image capture devices;
an image generator configured to combine the plurality of images captured by the image capture devices and to generate an image of an around view in which a point of view has been changed so that the vehicle and the areas around the vehicle are viewed from above in one screen;
an operation device capable of being operated by a vehicle occupant and comprising:
  a first switch provided in a central area of the operation device in a front view to be used to display the image of the around view in the display, the first switch including an upper face provide at a highest level in the operation device; and
  second switches provided at positions around the central area to be used to display the plurality of images in the display, the positions corresponding to the plurality of areas around the vehicle in a case in which the central area is considered as a vehicle position of the vehicle when viewed from above, each of the second switches including an upper face provided around the first switch, the upper surface of each of the second switches being downwardly inclined away from the first switch, the display being configured to display partition lines to partition the areas on the image of the around view so that the areas respectively correspond to positions of the first switch and the second switches viewed from above; and
a display controller configured to control the display to display the image of the around view,
wherein each of the first switch and the second switches is configured to detect a first continuous pressing operation and a second continuous pressing operation,
wherein:
  when the first continuous pressing operation is detected by the first switch, the display controller controls the display to change from displaying a first view image to display a second view image corresponding to the first switch, and, when a release of the first continuous pressing operation is detected by the first switch, the display controller controls the display to display the first view image; and
  when the second continuous pressing operation is detected by the first switch, the display controller controls the display to change from displaying the first view image to display the second view image corresponding to the first switch, and, when a release of the second continuous pressing operation is detected by the first switch, the display controller controls the display to keep displaying the second view image, and
wherein:
  when the first continuous pressing operation is detected by a selected second switch from among the second switches, the display controller controls the display to change from displaying the first view image to display a third view image corresponding to the selected second switch, and, when the release of the first continuous pressing operation is detected by the selected second switch, the display controller controls the display to display the first view image; and when the second continuous pressing operation is detected by the selected switch, the display controller controls the display to change from displaying the first view image to display the third view image corresponding to the selected second switch, and, when the release of the second continuous pressing operation is detected by the selected second switch, the display controller controls the display to keep displaying the third view image.

2. The in-vehicle image display apparatus according to claim 1,
wherein the operation device comprises a steering switch provided in a steering wheel of the vehicle.

3. The in-vehicle image display apparatus according to claim 1, further comprising:
input elements are configured to detect an operation status of each of the first switch and the second switches; and
a display controller configured to control the display change time to display one of the image of the around view and the plurality of images in the display according to the operation status detected by the input elements.

4. An in-vehicle image display apparatus comprising:
image capturing means for capturing a plurality of images of a plurality of areas around a vehicle;
displaying means for selectively displaying the plurality of images captured by the image capturing means;
image generating means for combining the plurality of images captured by the image capturing means and to generate an image of the around view in which a point of view has been changed so that the vehicle and the areas around the vehicle are viewed from above in one screen; and
an operation device capable of being operated by a vehicle occupant and comprising:
a first switch provided in a central area of the operation device in a front view to be used to display the image of the around view in the display, the first switch including an upper face provided at a highest level in the operation device;
second switches provided at positions around the central area to be used to display the plurality of images in the display, the positions corresponding to the plurality of areas around the vehicle in a case in which the central area is considered as a vehicle position of the vehicle when viewed from above, each of the second switches including an upper face provided around the first switch, the upper surface of each of the second switches being downwardly inclined away from the first switch, the display being configured to display partition lines to partition the areas on the image of the around view so that the areas respectively correspond to positions of the first switch and the second switches viewed from above; and
a display controller configured to control the displaying means to display the image of the around view,
wherein each of the first switch and the second switches is configured to detect a first continuous pressing operation and a second continuous pressing operation
wherein:
when the first continuous pressing operation is detected by the first switch, the display controller controls the displaying means to change from displaying a first view image to display a second view image corresponding to the first switch, and, when a release of the first continuous pressing operation is detected by the first switch, the display controller controls the displaying means to display the first view image; and when the second continuous pressing operation is detected by the first switch, the display controller controls the displaying means to change from displaying the first view image to display the second view image corresponding to the first switch, and, when a release of the second continuous pressing operation is detected by the first switch, the display controller controls the displaying means to keep displaying the second view image, and wherein:
when the first continuous pressing operation is detected by a selected second switch from among the second switches, the display controller controls the displaying means to change from displaying the first view image to display a third view image corresponding to the selected second switch, and, when the release of the first continuous pressing operation is detected by the selected second switch, the display controller controls the displaying means to display the first view image; and when the second continuous pressing operation is detected by the selected switch, the display controller controls the displaying means to change from displaying the first view image to display the third view image corresponding to the selected second switch, and, when the release of the second continuous pressing operation is detected by the selected second switch, the display controller controls the displaying means to keep displaying the third view image.

5. The in-vehicle image display apparatus according to claim 1, wherein, when an operation of a back key is detected, the display controller controls the display to display an image that was displayed prior to a current image being displayed.

6. The in-vehicle image display apparatus according to claim 1, wherein the first continuous pressing operation is detected as a light pressing operation by the user, and the second continuous pressing operation is detected as a firm pressing operation by the user.

7. The in-vehicle image display apparatus according to claim 1, wherein the first continuous pressing operation and the second continuous pressing operation are determined based on a length of time by which the user presses the first switch, and wherein the first continuous pressing operation is detected when the length of time is less than a threshold value and the second continuous pressing operation is detected when the length of time is equal to or greater than the threshold value.

8. The in-vehicle image display apparatus according to claim 1, wherein, when the second continuous pressing operation is detected by the first switch, the display controller controls the display to display the first view image after a predetermined period of time has elapsed.

9. The in-vehicle image display apparatus according to claim 1, wherein the first continuous pressing operation and the second continuous pressing operation are determined based on a length of time by which the user presses the selected second switch, and wherein the first continuous pressing operation is detected when the length of time is less than a threshold value and the second continuous pressing operation is detected when the length of time is equal to or greater than the threshold value.

10. The in-vehicle image display apparatus according to claim 1, wherein, when the second continuous pressing operation is detected by the selected second switch, the display controller controls the display to display the first view image after a predetermined period of time has elapsed.

* * * * *